US011670088B2

(12) United States Patent
Voodarla et al.

(10) Patent No.: US 11,670,088 B2
(45) Date of Patent: Jun. 6, 2023

(54) VEHICLE NEURAL NETWORK LOCALIZATION

(71) Applicant: Ford Global Technologies, LLC, Dearborn, MI (US)

(72) Inventors: Mokshith Voodarla, Santa Clara, CA (US); Shubham Shrivastava, Sunnyvale, CA (US); Punarjay Chakravarty, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/113,171

(22) Filed: Dec. 7, 2020

(65) Prior Publication Data

US 2022/0180106 A1 Jun. 9, 2022

(51) Int. Cl.
*G06V 20/56* (2022.01)
*H04W 4/46* (2018.01)
(Continued)

(52) U.S. Cl.
CPC ............. *G06V 20/56* (2022.01); *G06F 18/24* (2023.01); *G06N 3/045* (2023.01); *G06N 3/08* (2013.01);
(Continued)

(58) Field of Classification Search
CPC ...... G06V 20/56; G06V 10/25; G06V 10/751; G06V 10/82; G06K 9/6267; G06N 3/08;
(Continued)

(56) References Cited

U.S. PATENT DOCUMENTS 10,452,927 B2  10/2019  Stojanović et al.
2019/0050648 A1* 2/2019  Stojanovic ............ G06V 20/13
(Continued)

OTHER PUBLICATIONS

Lu, C., Gerardus van de Molengraft, M.J., Dubbelman, G., "Monocular Semantic Occupancy Grid Mapping with Convolutional Variational Encoder-Decoder Networks," arXiv, 2018, p. 1-8. (Year: 2018).*

(Continued)

*Primary Examiner* — Ping Y Hsieh
*Assistant Examiner* — Daniella M. DiGuglielmo
(74) *Attorney, Agent, or Firm* — Frank A. MacKenzie; Bejin Bieneman PLC

(57) ABSTRACT

A plurality of temporally successive vehicle sensor images are received as input to a variational autoencoder neural network that outputs an averaged semantic birds-eye view image that includes respective pixels determined by averaging semantic class values of corresponding pixels in respective images in the plurality of temporally successive vehicle sensor images. From a plurality of topological nodes that each specify respective real-world locations, a topological node closest to the vehicle, and a three degree-of-freedom pose for the vehicle relative to the topological node closest to the vehicle, is determined based on the averaged semantic birds-eye view image. A real-world three degree-of-freedom pose for the vehicle is determined by combining the three degree-of-freedom pose for the vehicle relative to the topological node and the real-world location of the topological node closest to the vehicle.

20 Claims, 9 Drawing Sheets

(51) Int. Cl.
  *G06N 3/08*   (2023.01)
  *G06V 10/25*  (2022.01)
  *G06V 10/75*  (2022.01)
  *G06F 18/24*  (2023.01)
  *G06N 3/045*  (2023.01)
  *G06V 10/82*  (2022.01)
  *G06N 3/088*  (2023.01)
  *G06N 3/047*  (2023.01)

(52) U.S. Cl.
  CPC ............ *G06V 10/25* (2022.01); *G06V 10/751* (2022.01); *G06V 10/82* (2022.01); *H04W 4/46* (2018.02); *G06N 3/047* (2023.01); *G06N 3/088* (2013.01)

(58) Field of Classification Search
  CPC .... G06N 3/0472; G06N 3/088; G06N 3/0454; G06N 3/045; G06N 3/047; H04W 4/46; B60W 60/0015; G06F 18/24
  See application file for complete search history.

(56) References Cited

U.S. PATENT DOCUMENTS

| | | |
|---|---|---|
| 2020/0041276 A1 | 2/2020 | Chakravarty et al. |
| 2020/0098135 A1 | 3/2020 | Ganjineh et al. |

OTHER PUBLICATIONS

Dziubiński, M.,"From semantic segmentation to semantic bird's-eye view in the CARLA simulator," Acta Scholar Automata Polonica, Sep. 10, 2020, 13 pages.

Roussel, T. et al., "Deep-Geometric 6 DoF Localization from a Single Image in Topo-metric Maps," rXiv:2002.01210v1 [cs.CV], Feb. 4, 2020, 7 pages.

* cited by examiner

VEHICLE NEURAL NETWORK LOCALIZATION

BACKGROUND

Vehicles can be equipped with computing devices, networks, sensors, and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

BRIEF SUMMARY

Figure 1:
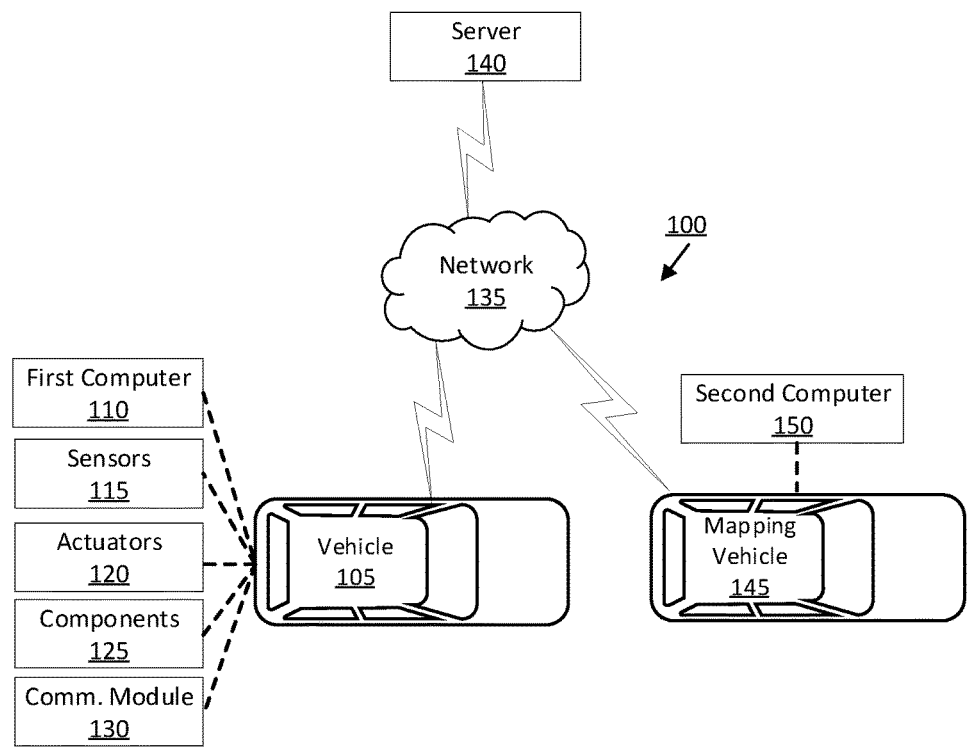
FIG. 1 is a diagram of an example traffic infrastructure system.

A system includes a computer including a processor and a memory, the memory storing instructions executable by the processor to receive a plurality of temporally successive vehicle sensor images as input to a variational autoencoder neural network that outputs an averaged semantic birds-eye view image that includes respective pixels determined by averaging semantic class values of corresponding pixels in respective images in the plurality of temporally successive vehicle sensor images. The instructions further include instructions to, from a plurality of topological nodes that each specify respective real-world locations, determine a topological node closest to the vehicle, and a three degree-of-freedom pose for the vehicle relative to the topological node closest to the vehicle, based on the averaged semantic birds-eye view image. The instructions further include instructions to determine a real-world three degree-of-freedom pose for the vehicle by combining the three degree-of-freedom pose for the vehicle relative to the topological node and the real-world location of the topological node closest to the vehicle The instructions can further include instructions to generate the averaged semantic birds-eye view image based on rendering a semantic point cloud image of an environment around the vehicle into a two dimensional plane.

The instructions can further include instructions to generate the semantic point cloud image based on combining a semantic image that includes regions labeled by region type and a stereo point cloud image that includes regions labeled by region distance relative to the vehicle.

The instructions can further include instructions to generate the stereo point cloud image based on a pair of stereo images acquired by a sensor in the vehicle.

The instructions can further include instructions to generate the semantic image based on a single stereo image acquired by a sensor in the vehicle.

The region types can include roadway, sidewalk, vehicle, building, and foliage.

The instructions can further include instructions to determine the topological nodes by acquiring point cloud images with a stereo camera and determining locations of the point cloud images in real-world coordinates with visual odometry.

The real-world three degree-of-freedom pose for the vehicle can be determined in coordinates based on orthogonal x and y axes and a yaw rotation about a z axis orthogonal to the x and y axes.

The instructions can further include instructions to train the variational autoencoder neural network to output the averaged semantic birds-eye view image using a plurality of modified semantic birds-eye view images.

The instructions can further include instructions to generate each of the plurality of modified sematic birds-eye view images based on at least one of translating or rotating the semantic birds-eye view image.

The variational autoencoder neural network can determine the three degree-of-freedom pose for the vehicle relative to the topological node closest to the vehicle by outputting latent variables to fully connected layers.

The variational autoencoder neural network can determine the topological node closest to the vehicle by inputting latent variables of the averaged semantic birds-eye view to a nearest neighbor classifier trained to determine the topological node closest to the vehicle.

A method includes receiving a plurality of temporally successive vehicle sensor images as input to a variational autoencoder neural network that outputs an averaged semantic birds-eye view image that includes respective pixels determined by averaging semantic class values of corresponding pixels in respective images in the plurality of temporally successive vehicle sensor images. The method further includes, from a plurality of topological nodes that each specify respective real-world locations, determining a topological node closest to the vehicle, and a three degree-of-freedom pose for the vehicle relative to the topological node closest to the vehicle, based on the averaged semantic birds-eye view image. The method further includes determining a real-world three degree-of-freedom pose for the vehicle by combining the three degree-of-freedom pose for the vehicle relative to the topological node and the real-world location of the topological node closest to the vehicle.

The method can further include generating the averaged semantic birds-eye view image based on rendering a semantic point cloud image of an environment around the vehicle into a two dimensional plane.

The method can further include generating the semantic point cloud image based on combining a semantic image that includes regions labeled by region type and a stereo point cloud image that includes regions labeled by region distance relative to the vehicle.

The method can further include determining the topological nodes by acquiring point cloud images with a stereo camera and determining locations of the point cloud images in real-world coordinates with visual odometry.

The real-world three degree-of-freedom pose for the vehicle can be determined in coordinates based on orthogonal x and y axes and a yaw rotation about a z axis orthogonal to the x and y axes.

The method can further include training the variational autoencoder neural network to output the averaged semantic birds-eye view image using a plurality of modified semantic birds-eye view images.

The variational autoencoder neural network can determine the three degree-of-freedom pose for the vehicle relative to the topological node closest to the vehicle by outputting latent variables to fully connected layers.

The variational autoencoder neural network can determine the topological node closest to the vehicle by inputting latent variables of the averaged semantic birds-eye view to a nearest neighbor classifier trained to determine the topological node closest to the vehicle.

Further disclosed herein is a computing device programmed to execute any of the above method steps. Yet further disclosed herein is a computer program product, including a computer readable medium storing instructions executable by a computer processor, to execute any of the above method steps.

DETAILED DESCRIPTION

A vehicle computer in a vehicle can be programmed to acquire data regarding the environment around the vehicle and to use the data to determine a path upon which to operate the vehicle in an autonomous or semi-autonomous mode. The vehicle can operate on a roadway based on the path by determining commands to direct the vehicle's powertrain, braking, and steering components to operate the vehicle to travel along the path. The data regarding the environment can include the location of one or more objects such as vehicles and pedestrians, etc., in the environment around the vehicle and can be used by the vehicle computer to operate the vehicle.

Determining a path can include solving a localization problem. Localization includes determining a three degree-of-freedom (DoF) pose for the vehicle with respect to a map of the environment around the vehicle. A three DoF pose includes a location in two orthogonal coordinates (x, and y for example) and orientation in one rotation about an axis of a third orthogonal coordinate (yaw, for example). Localizing the vehicle with respect to a map and perceiving objects in the environment around the vehicle can permit the vehicle computer to determine a path upon which the vehicle can travel to reach a destination on the map while avoiding contact with objects in the environment around the vehicle. A path can be a polynomial function determined to maintain lateral and longitudinal accelerations of the vehicle within upper and lower limits as it travels on the vehicle path.

Solving localization problems for vehicle routing can begin by recognizing that vehicles typically travel repeatedly along the same routes. Techniques disclosed herein can take advantage of predictable travel patterns by creating a topological map of repeatedly traveled routes that can be used by the vehicle computer to solve the localization problem using less expensive equipment and fewer computer resources that would otherwise be required to determine a path for the vehicle. Techniques described herein perform localization of the environment around the vehicle by first determining a topological map of a route to be traveled by the vehicle. A route is defined as a path that describes successive locations of a vehicle as it travels from one point to a second point on a map, typically on roadways.

The topological map is a map that includes location and image data that can be used by the vehicle computer to determine data including vehicle location and locations of objects in the environment around the vehicle. Each node includes three DoF data for a location along a route and an averaged semantic birds-eye view image of the location. The three DoF data and the averaged semantic birds-eye view image are used to train a neural network to input temporally successive images acquired by a sensor included in a vehicle and output data identifying the closest node of the topological map to the vehicle and the three DoF pose of the vehicle with respect to the topological map. Techniques disclosed herein improve localization by determining a three DoF location of the vehicle based on an averaged semantic birds-eye view image, which can determine the three DoF location of the vehicle regardless of weather and lighting conditions around the vehicle.

Figure 2:
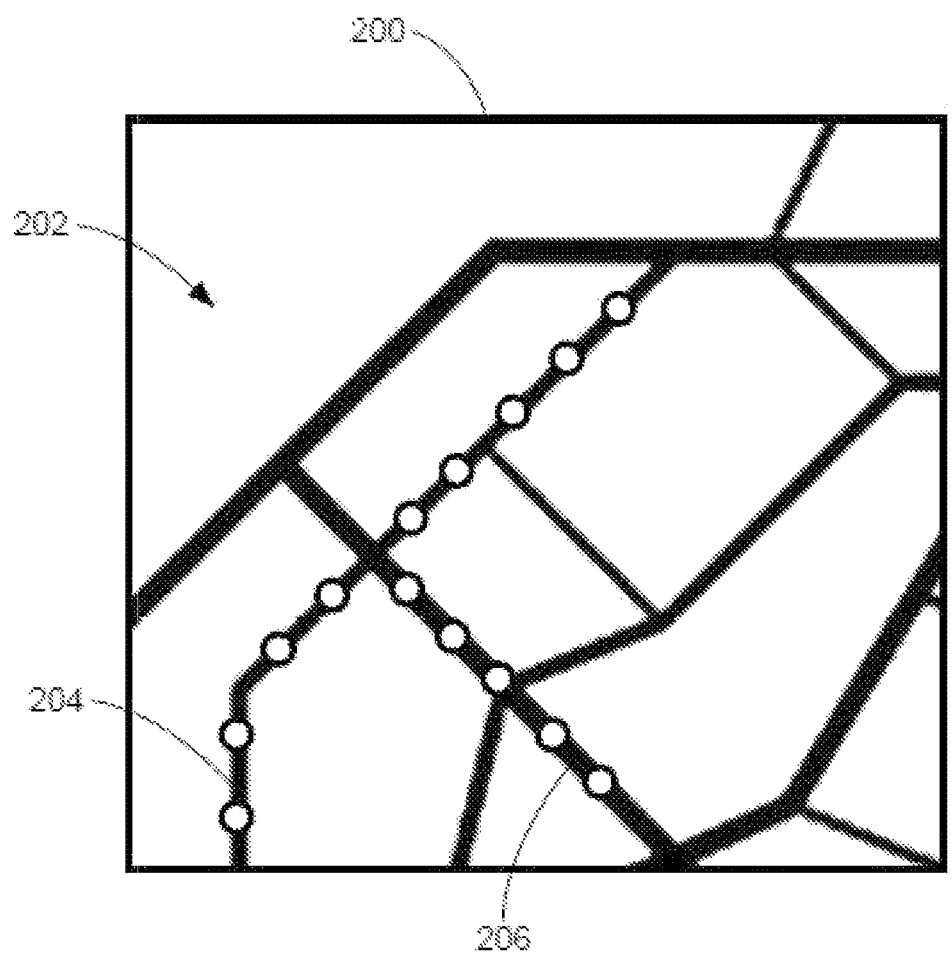
FIG. 2 is a diagram of an example illustration of a topological map.
Figure 3:
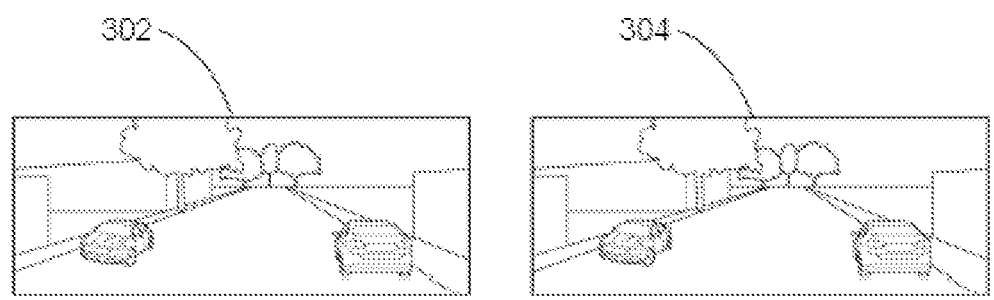
FIG. 3 is a diagram of example stereo images.

With reference to FIGS. 1-3, an example control system 100 includes a vehicle 105. A first computer 110 in the vehicle 105 receives data from sensors 115. The first computer 110 is programmed to receive a plurality of temporally successive sensor 115 images as input to a variational autoencoder neural network that outputs an averaged semantic birds-eye view image that includes respective pixels determined by averaging semantic class values of corresponding pixels in respective images in the plurality of temporally successive vehicle sensor images. The first computer 110 is further programmed to, from a plurality of topological nodes that each specify respective real-world locations, determine a topological node closest to the vehicle 105, and a three degree-of-freedom pose for the vehicle 105 relative to the topological node closest to the vehicle 105, based on the averaged semantic birds-eye view image. The first computer 110 is further programmed to determine a real-world three degree-of-freedom pose for the vehicle 105 by combining the three degree-of-freedom pose for the vehicle 105 relative to the topological node and the real-world location of the topological node closest to the vehicle 105. The first computer 110 can then generate a path for the vehicle 105 based on the real-world three degree-of-freedom pose and operate the vehicle 105 along the path.

Turning now to FIG. 1, the vehicle 105 includes the first computer 110, sensors 115, actuators 120 to actuate various vehicle components 125, and a vehicle communications module 130. The communications module 130 allows the first computer 110 to communicate with a remote server computer 140 and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The first computer 110 includes a processor and a memory such as are known. The memory includes one or more forms of computer-readable media, and stores instructions executable by the first computer 110 for performing various operations, including as disclosed herein. The first computer 110 can further include two or more computing devices operating in concert to carry out vehicle 105 operations including as described herein. Further, the first computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the first computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the first computer 110.

The first computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the first computer 110; in a semi-autonomous mode the first computer 110 controls one or two of vehicle 105 propulsion, braking, and steering; in a non-autonomous mode a human operator controls each of vehicle 105 propulsion, braking, and steering.

The first computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the first computer 110, as opposed to a human operator, is to control such operations.

The first computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The first computer 110 is generally arranged for communications on a vehicle communication network that can include a bus in the vehicle 105 such as a controller area network (CAN) or the like, and/or other wired and/or wireless mechanisms.

Via the vehicle 105 network, the first computer 110 may transmit messages to various devices in the vehicle 105 and/or receive messages (e.g., CAN messages) from the various devices, e.g., sensors 115, an actuator 120, ECUs, etc. Alternatively, or additionally, in cases where the first computer 110 actually comprises a plurality of devices, the vehicle communication network may be used for communications between devices represented as the first computer 110 in this disclosure. Further, as mentioned below, various controllers and/or sensors 115 may provide data to the first computer 110 via the vehicle communication network.

Vehicle sensors 115 may include a variety of devices such as are known to provide data to the first computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, other vehicles, etc., relative to the location of the vehicle 105. The sensors 115 may further alternatively or additionally, for example, include camera sensor(s) 115, e.g., front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items discussed herein, fall within the definition of "object" herein.

The first computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects, e.g., vehicles, trees, buildings, etc., and/or markings, e.g., lane markings, on or along a road on which a vehicle 105 is currently operating. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the first computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a first computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The control system 100 can include a mapping vehicle 145. The mapping vehicle 145 may include a second, i.e., mapping vehicle, computer 150. The second computer 150 includes a second processor and a second memory such as are known. The second memory includes one or more forms of computer-readable media, and stores instructions executable by the second computer 150 for performing various operations, including as disclosed herein.

Additionally, the mapping vehicle 145 may include sensors, actuators to actuate various vehicle components, and a vehicle communications module. The sensors, actuators to actuate various vehicle components, and the vehicle communications module typically have features in common with the sensors 115, actuators 120 to actuate various host vehicle components 125, and the vehicle communications module 130, and therefore will not be described further to avoid redundancy.

FIG. 2 is a diagram of a topological map 200. A topological map 200 is a map that includes a set of nodes 202, each of which includes real-world coordinate data regarding the location of the node 202 and an averaged semantic birds-eye view image 504 (as discussed below in regards to FIG. 5B) for the node 202 derived from the stereo video data. A topological map is generated by processing stereo video data of the route to form a plurality of nodes 202, as discussed below. For example, the topological map 200 can be constructed by using video odometry to determine topological nodes 202 along a route or roadway 204, 206. The terms roadways and routes will be used interchangeably herein. A topological map 200 can be illustrated as in FIG. 2 by modifying a street map by adding nodes 202, illustrated as circles on roadways or routes, 204, 206. The topological map 200 can be stored, e.g., in a memory of the remote server computer 140, and provided to vehicles 105, 145, e.g., via the network 135.

Each node 202 is located on a roadway 204, 206 that can be traveled along by a vehicle 105, 145. Nodes 202 are located with one to 10 meters distance between adjacent nodes 202. Spacing out nodes 202 in this fashion permits location of a vehicle 105, 145 within a few centimeters, for example, one to 25 centimeters, in x and y directions (i.e., lateral and longitudinal directions) relative to the roadway 204, 206 while maintaining a limit on the amount of data required to represent the roadway 204, 206. The roadway 204, 206 is mapped using a mapping vehicle 145 equipped with a stereo camera to obtain stereo video data of each node 202 along the roadway 204, 206. The mapping vehicle 145 can then generate a semantic point cloud image 402 for each node 202 based on the stereo video data, as discussed below. Additionally, the mapping vehicle 145 can generate, for each node 202 in the topological map 200, an averaged semantic birds-eye view image 504 with corresponding feature points using latent variables from a neural network, as discussed below. Alternatively, the mapping vehicle 145 can provide the stereo video data to the remote server computer 140 that can generate the semantic point cloud image 402 and the averaged semantic birds-eye view image 504 for the respective node 202.

In this context, a "semantic point cloud image" is a point cloud image that includes labels that identify regions within the image corresponding to objects. In this context, a "point cloud image" is point cloud data that includes distances or ranges to points in the image. Said differently, a semantic point cloud is a point cloud image where the point cloud data corresponding to distances is also labeled with semantic class values to identify the type of object or region. Regions so labeled can include roadways, sidewalks, vehicles, pedestrians, buildings and foliage, etc. A semantic class value is an integer that corresponds to one type of object or region.

FIG. 3 is a diagram of a pair of stereo images 302, 304. Stereo images 302, 304 can be acquired by a stereo camera sensor 115, where two cameras are arranged to view the same scene with a lateral separation. The lateral separation, also referred to as the baseline, causes the cameras to generate images where corresponding points in each image will be displaced with respect to the image by an amount that is a function of the lateral separation of the cameras and the distance of the point in space from the cameras. Because the lateral separation of the cameras can be precisely determined, a straightforward geometric transformation can yield distances to points in the images, e.g., as described further below.

Figure 4:
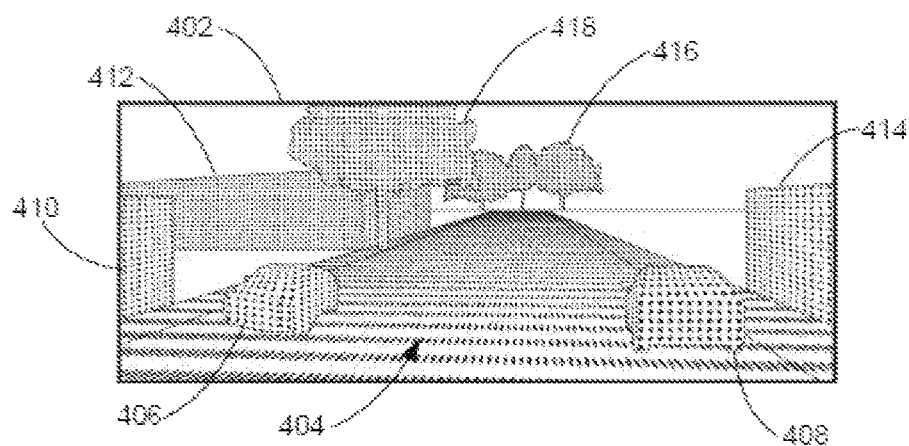
FIG. 4 is a diagram of an example point cloud image.

FIG. 4 is a diagram of a semantic point cloud image 402 generated from an averaged stereo point cloud image and a semantic image. In this context, "a semantic image" is an image that is labeled with semantic class values that identify the type of object or region within the image. That is, each pixel in the image is labeled with one semantic class value corresponding to the type of object or region detected in the pixel, as discussed further below. In this context, an "averaged stereo point cloud image" is a stereo point cloud image that includes pixels corresponding to an average distance from the point corresponding to the respective pixel in each of a plurality of stereo point cloud images to the stereo camera sensor 115.

The averaged stereo point cloud image is generated from a plurality of temporally successive pairs of stereo images, i.e., stereo video data. While the pixels values in a pair of stereo images 302, 304 correspond to the amount of light received by the stereo camera sensor 115, in a stereo point cloud image the value of the pixels correspond to distances from the point corresponding to the pixel to the stereo camera sensor 115. In other words, a stereo point cloud image includes regions labeled by region distance relative to the stereo camera sensor 115.

A stereo point cloud image can be constructed from a pair of stereo images 302, 304 based on stereo disparity. Stereo disparity is defined as the difference in corresponding feature point locations in a pair of stereo images 302, 304. Corresponding feature points are defined as locations in the pair of stereo images 302, 304 that share similar pixel values including regions around the locations. For example, corners, edges and textures in the pair of stereo images 302, 304 can be corresponding feature points. The feature points can be determined by known machine vision techniques which determine feature points by processing regions in images to find pixel locations that can be defined by patterns of abrupt changes in pixel values, for example edges and corners and textures. Patterns of pixel values around feature points can be compared between pairs of stereo images to identify corresponding feature points that occur in both images. The difference in location with respect to the array of image points can be used to measure stereo disparity. Feature point detection can be found using machine vision techniques, e.g., such as speeded up robust features (SURF).

Once corresponding feature points in a pair of stereo images 302, 304 are identified by determining similar arrangements of pixel values, a distance from the stereo camera sensor 115 to the feature points can be determined. Because the distance between the two cameras is determined by the fixed mount to which the cameras are attached, a baseline is established that permits the distance from the cameras to corresponding feature points to be determined by triangulation. An equation for determining the distance from the stereo camera sensor 115 to a feature point $P=x_p, y_p, z_p$ in overlapping fields of view of a pair of stereo image sensors corresponding to image feature locations $P(u_1, v_1)$, $P(u_2, v_2)$ in first and second stereo images 302, 304 based on stereo disparity is given by the equations:

$$d = u_1 - u_2 \quad (1)$$

$$x_p = \frac{bu_1}{d},$$
$$y_p = \frac{bv_1}{d}, \quad (2)$$
$$z_p = \frac{bf}{d}$$

where d is the disparity determined by a difference in feature coordinates locations $u_1$-$u_2$ in the x-direction, b is the baseline between the centers of the two cameras and f is the common focal distance of the two cameras. Distances to a plurality of corresponding feature points determined in this fashion can be assembled into a stereo point cloud image. A stereo point cloud image can be generated for each pair of stereo images 302, 304. The stereo point cloud images can then be combined, e.g., by averaging the distances to each of the plurality of corresponding feature points in the respective stereo point cloud images, to generate the averaged stereo point cloud image.

An averaged stereo point cloud image can also be determined by training a convolutional neural network (CNN) to determine the averaged stereo point cloud image from a plurality of temporally successive pairs of stereo images 302, 304. A convolutional neural network includes a plurality of convolutional layers followed by a plurality of fully connected layers. The convolutional layers can determine the feature points, which are passed as latent variables to the fully connected layers, which calculate the equivalent of equations (1) and (2). A CNN can be trained to determine an averaged stereo point cloud image from a plurality of temporally successive pairs of stereo images 302, 304 using a training dataset that includes pairs of stereo images 302, 304 along with ground truth point cloud images that have been determined using feature points and geometric processing based on equations (1) and (2). Ground truth is data corresponding to a correct result output from a CNN, i.e., data correctly representing a real-world state, where the ground truth data is acquired from a source independent from the CNN. Ground truth is used to compare to the result output from a CNN when training the CNN to determine when the CNN is outputting a correct result. For example, ground truth for point cloud data can be determined by manually selecting corresponding feature points in a pair of stereo images and manually calculating distances based on measured baseline and camera focal length to form ground truth point cloud data.

In addition to distances, the pixel values of the semantic point cloud image 402 can correspond to regions from a semantic image. That is, in the semantic point cloud image 402, objects corresponding to a roadway, vehicles, trees and buildings adjacent to the roadway have been labeled to identify the regions of pixels in the semantic point cloud image 402 corresponding to the labeled objects in the semantic image. The semantic image includes regions labeled by region type, e.g., vehicles, roadways, buildings, foliage, etc. The semantic image is generated from one image of the stereo image pair 302, 304. For example, one of the RGB images included in the stereo image pairs 302, 304 can be input to a convolutional neural network (CNN) that has been trained to segment images Image segmentation is a machine vision technique that labels objects in image data. That is, the CNN can be programmed to segment and classify objects based on connected regions of pixels in RGB image data.

The connected regions can be classified by labeling each connected region with one of a number of different semantic class values corresponding to objects. As set forth above, each semantic class value is an integer that corresponds to one type of object or region. The semantic class values can be selected by the CNN based on the size, shape, and location of the objects in an RGB image. For example, a CNN can include different semantic class values, e.g., for different makes and models of vehicles, different types of terrain (e.g., grass, mud, gravel, etc.), different types of foliage (e.g., trees, bushes, shrubs, etc.), etc. The CNN can label objects in an input image and then the labels can be combined with the point cloud image, as discussed below.

The CNN can be trained to label regions in RGB image data by first constructing a training dataset, where RGB images are labeled manually by humans using image processing software to draw boundaries around objects and filling in the boundaries with pixel values corresponding to the objects. The manually labeled RGB images are ground truth to be compared with the output of the CNN. The dataset can include more than 1000 RGB images with corresponding ground truth. The CNN is executed a plurality of times with the same RGB image as input while changing sets of parameters that govern the operation of the convolutional layers and fully connected layer included in the CNN. The sets of parameters are graded depending upon how similar the output is to the corresponding ground truth. The highest scoring sets of parameters over the training dataset are retained as the set of parameters to use when operating the trained CNN.

Figure 5A:
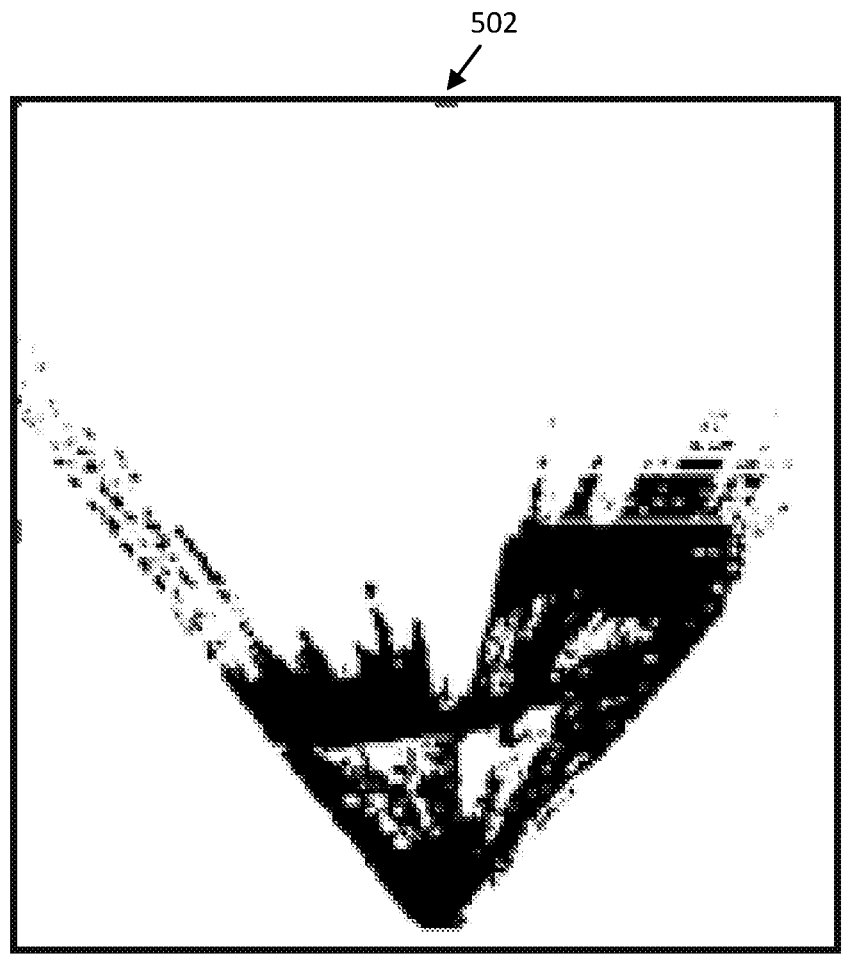
FIG. 5A is a diagram of an example semantic birds-eye view image.

FIG. 5A is a diagram of a semantic birds-eye view image 502 generated from an example semantic point cloud image. A semantic birds-eye view image 502 is a two-dimensional (2D) image produced by rendering a semantic point cloud image. Rendering can produce a semantic birds-eye view image of a semantic point cloud image by determining a virtual camera point of view from which to project the semantic point cloud images to a 2D plane.

A virtual camera can be provided by programming of a computer 110, 140, 150 to generate a 2D semantic birds-eye view image from a semantic point cloud image. The computer 110, 140, 150 can generate virtual light rays that pass from a virtual image sensor through a virtual lens, obeying the laws of physics just as if the image sensor and lens were physical objects. The computer 110, 140, 150 inserts data into the virtual image sensor corresponding to the appearance of the portion of a semantic point cloud image that a ray of light emitted by the feature points of the semantic point cloud image and passing through a physical lens would produce on a physical image sensor. By situating a virtual camera at a selected location and orientation with respect to the semantic point cloud image, a 2D semantic birds-eye view image corresponding to a selected viewpoint with respect to a vehicle 105, 145 can be generated.

The virtual camera point of view includes location and orientation data for an optical axis of the virtual camera and data regarding the magnification of the virtual camera lens. The virtual camera point of view is determined based on the location and orientation of a virtual camera with respect to a vehicle 105, 145. The location of the virtual camera is selected to be above the vehicle 105, 145 and on a y axis of a semantic point cloud image. Additionally, the orientation of the virtual camera corresponds to the orientation of the vehicle 105, 145. That is, the point of view of the virtual camera is a top view of the environment included in the semantic point cloud image. Projecting the semantic point cloud image onto a 2D plane corresponds to determining which feature points of the semantic point cloud image would be visible to a camera acquiring an image of the semantic point cloud image from the selected location and orientation. Because the semantic birds-eye view image 502 was generated from a semantic point cloud image based on a virtual camera at a selected location and orientation, data regarding the location and orientation of the feature points illustrated in the semantic birds-eye view image 502 is known.

Alternatively, the semantic birds-eye view image 502 can be constructed from the semantic point cloud image based on coordinates of feature points in the semantic point cloud image. Specifically, the computer 110, 140, 150 can plot the x and z coordinates of each feature in the semantic point cloud image into a 2D plane. In this situation, the x coordinates can be plotted along a horizontal axis, e.g., generally parallel to a vehicle-lateral axis, and the z coordinates can be plotted along a vertical axis, e.g., generally parallel to a vehicle-longitudinal axis. The semantic birds-eye view image 502 includes a field of view within which all of the feature points of the semantic point cloud image are plotted. The field of view is defined by the sensor 115, e.g., the stereo cameras.

Figure 5B:
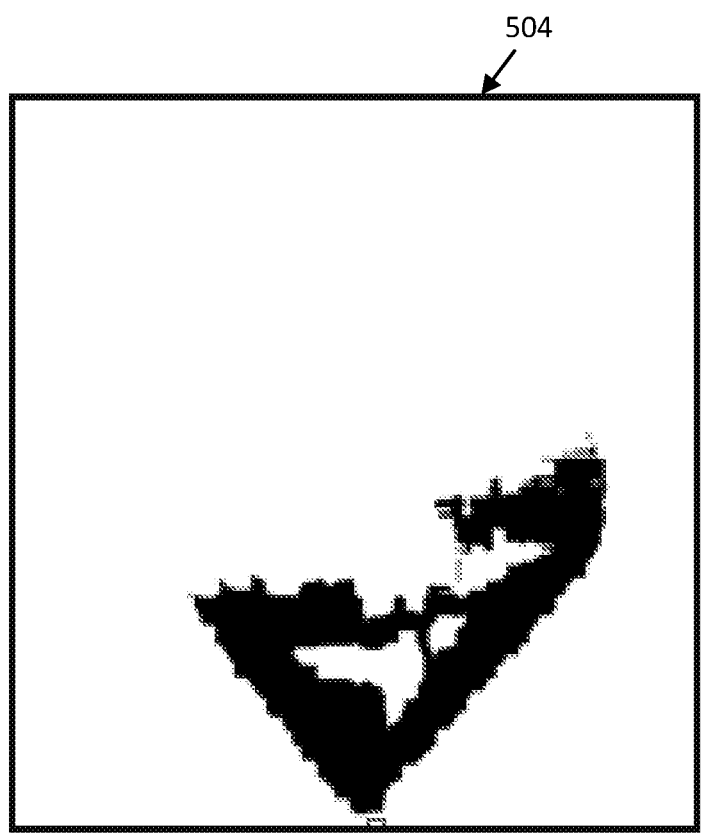
FIG. 5B is a diagram of an example averaged semantic birds-eye view image generated from the sematic birds-eye view image of FIG. 5A.

FIG. 5B is a diagram of an averaged semantic birds-eye view image 504 generated from a semantic birds-eye view image 502. An "averaged semantic birds-eye view image" is a semantic birds-eye view image that includes pixels corresponding to an average distance from the point corresponding to the respective pixel in each of a semantic birds-eye view image and a plurality of modified semantic birds-eye view images to the stereo camera sensor 115 and an average semantic class value corresponding to the respective pixel in each of the semantic birds-eye view image and the plurality of modified semantic birds-eye view images. That is, corresponding pixel values in the semantic birds-eye view image and the plurality of modified semantic birds-eye view images are averaged to generate the averaged semantic birds-eye view image.

The averaged semantic birds-eye view image 504 is generated from a plurality of modified semantic birds-eye view images. The computer 110, 140, 150 can generate the plurality of modified semantic birds-eye view images by transforming a semantic birds-eye view image 502 for the node 202. For example, the computer 110, 140, 150 can translate, e.g., along at least one of the x or z axes, the field of view of the semantic birds-eye view image 502 relative to the feature points such that some of the feature points are outside of the field of view of the modified semantic birds-eye view image. Additionally, or alternatively, the computer 110, 140, 150 can rotate, e.g., about they axis, the field of view of the semantic birds-eye view image 502 relative to the feature points such that some of the feature points are outside of the field of view of the modified semantic birds-eye view image.

Said differently, the computer 110, 140, 150 can update the location, e.g., by translating a predetermined amount along the x axis, and/or orientation, e.g., by rotating a predetermined amount about the y axis, of the virtual camera relative to the semantic point cloud image. After updating the location and/or orientation of the virtual camera, the computer 110, 140, 150 can obtain a modified semantic birds-eye view. The computer 110, 140, 150 can generate any suitable number of modified semantic birds-eye view images.

The modified semantic birds-eye view images are then combined with the semantic birds-eye view image 502 for the node 202 to construct the averaged semantic birds-eye view image 504 for the node 202. Specifically, the computer 110, 140, 150 determines respective pixels in the averaged semantic birds-eye view image 504 by averaging semantic class values and distances of corresponding pixels in the semantic birds-eye view image 502 and respective modified semantic birds-eye view images. The computer 110, 140, 150 can then include the averaged semantic birds-eye view image 504 with the node 202 data.

Figure 6:
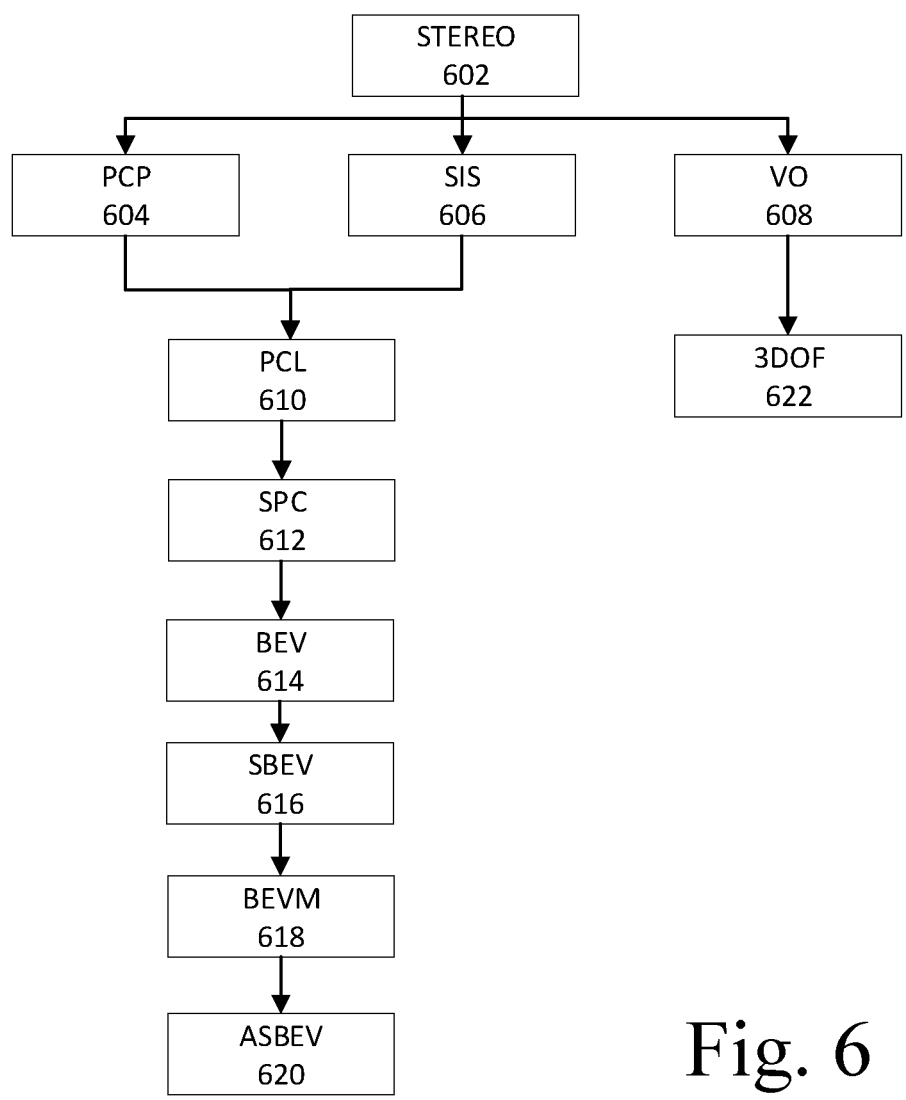
FIG. 6 is an example node system that generates topological nodes.

FIG. 6 is a diagram of a node system 600 that generates node 202 data from pairs of stereo images (STEREO) 602 acquired as a mapping vehicle 145 equipped with stereo video sensors travels along a roadway 204, 206 to be mapped. Node system 600 can be implemented as software operating on the second computer 150. In this situation, the second computer 150 can include the node 202 data in the topological map 200 and provide the topological map 200 to the remote server computer 140, e.g., via the network 135. As another example, node system 600 can be implemented as software operating on the remote server computer 140. In this situation, the remote server computer 140 can generate node 202 data and include the node 202 data in the topological map 200. The remote server computer 140 can then provide the topological map 200 to the vehicles 105, 145, e.g., via the network 135.

When the mapping vehicle 145 has progressed along the roadway 204, 206 a specified distance from a previous node 202, which can be one to 10 meters, for example, the second computer 150, or the remote server computer 140, can create a new node 202 and place in into the topological map 200. Each node 202 in the topological map 200 includes an averaged semantic birds-eye view image 504 and a three DoF pose corresponding to the location of the node 202 on the topological map 200.

As the mapping vehicle 145 travels along a route 204, 206, the mapping vehicle 145 acquires pairs of stereo images

602, i.e., stereo video data, via the stereo video sensor. The second computer 150 can then input the pairs of stereo images 602 into the node system 600. The pairs of stereo images 602 are processed by point cloud processor (PCP) 604 to form an averaged stereo point cloud image by determining three dimensional locations of corresponding feature points based on stereo disparity between the pairs of stereo images 602. PCP 604 can be a CNN as discussed above in relation to FIG. 4.

Additionally, the pairs of stereo images 602 are passed to an image segmentation processor (SIS) 606. Image segmentation processor 606 segments one of the RGB images in the pairs of stereo images 602 to generate a semantic image using a CNN as discussed above in relation to FIG. 4. The pairs of stereo images 602 are processed one at a time as RGB images by segmentation processor (SIS) 606. SIS 606 is a CNN trained to label regions in RGB image data, as discussed above in relation to FIG. 4.

The sematic image is passed to point cloud labeling processor (PCL) 610 where a point cloud image from PCP 604 is combined with the sematic image formed from the pairs of stereo images 602 that generated the averaged stereo point cloud image to form a semantic point cloud image 612. For example, in FIG. 4, a roadway 404, vehicles 406, 408, buildings 410, 412, 414 and foliage 416, 418 have been labeled, making a stereo point cloud image a semantic point cloud image 402.

The semantic point cloud image 612 is input into a birds-eye view processor (BEV) 614 where a semantic birds-eye view image 616 is generated from the semantic point cloud image 612. For example, the semantic point cloud image 612 can be rendered to produce the semantic birds-eye view image 616 in a 2D plane by determining a location and orientation of a virtual camera, as discussed above. As another example, the x and z coordinates of the feature points in the semantic point cloud image 612 can be plotted to generate the semantic birds-eye view image 616, as discussed above.

The semantic birds-eye view 616 image is input into birds-eye view modifying processor (BEVM) 618 where an averaged semantic birds-eye view image 620 is generated from the semantic birds-eye view image 616. For example, the BEVM 618 can generate a plurality of modified semantic birds-eye view images from the semantic birds-eye view image 616, e.g., by transforming the semantic birds-eye view image 620 for the node 202, as discussed above regarding FIG. 5B. The modified semantic birds-eye view images are then combined with the semantic birds-eye view image 616 for the node 202 to construct the averaged semantic birds-eye view image 620 for the node, as discussed above regarding FIG. 5B.

Additionally, a plurality of pairs of stereo images 602 are input to a visual odometry processor (VO) 608. Stereo visual odometry is a technique for determining a three DoF (3DOF) pose 622 for the mapping vehicle 145 based on determining changes in the locations of feature points extracted from the images as the mapping vehicle 145 moves through a scene. Visual odometry can be performed by a trained variational autoencoder (VAE). A VAE is a neural network that includes an encoder, a decoder and a loss function. A VAE can be trained to input image data, encode the image data to form latent variables that correspond to an encoded representation of the input image data and decode the latent variables to output an image that includes portions of the input image data modified in a deterministic fashion. The VAE can be trained by determining a loss function which measures how accurately the VAE has encoded and decoded the image data. Once a VAE is trained, the encoder portion, or "head" can be removed from the VAE and used to form latent variables that correspond to the input images. The latent variables formed by the encoder can be processed by decoding sections that derive additional types of data, for example three DoF data that describes the pose of the camera that acquired the input image as discussed below.

Visual odometry is a known technique for determining three DoF data from a sequential series of images. Visual odometery can be determined by training a VAE to input stereo pairs of images and outputting three DoF data. The VAE determines corresponding feature points in sequential images and calculates the change in location of the sensor between images. A three DoF pose for the camera can be determined by triangulating two or more sets of feature points to determine translation and rotation to determine a frame of reference for the sensor in global coordinates. The VAE can be trained by determining ground truth using an inertial measurement unit (IMU) and real time kinematic-enhanced global positioning systems (GPS-RTK).

A VAE includes an encoder, a decoder and a loss function. The encoder inputs image data and encodes the input image data into latent variables. The latent variables are then decoded to form a three DoF pose for the mapping vehicle 145 based on the input image data. The loss function is used to train the encoder and decoder by determining whether the three DoF poses 622 are valid poses for a vehicle on a roadway based on training the encoder and decoder using ground truth data regarding three DoF poses 622 corresponding to the input images determined based on real-world measurements of a vehicle three DoF pose 622. Visual odometry processor 608 determines three DoF poses 622 based on a plurality of pairs of stereo images 602 acquired as the mapping vehicle 145 travels along the path to be topologically mapped. The three DoF pose 622 locates the mapping vehicle 145 with respect to global coordinates. The computer 140, 150 can then include the three DoF pose 622 with the node 202 data.

Figure 7:
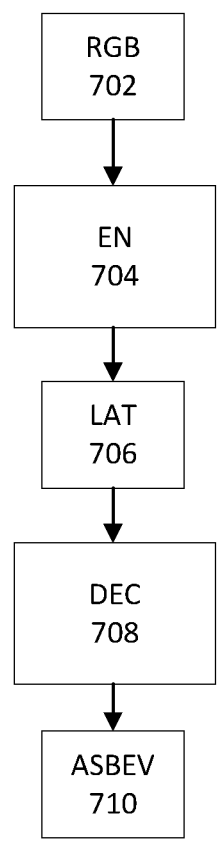
FIG. 7 is an example of a topological convolutional neural network.

FIG. 7 is a diagram of a topological CNN 700. A topological CNN 700 is a type of VAE. A topological CNN 700 is a neural network that can be trained to input a plurality of temporally successive images 702, e.g., stereo video data, and output an averaged semantic birds-eye view image 710. The VAE includes an encoder (EN) 704 which includes convolutional layers that encode the input images 702 into latent variables (LAT) 706 and a decoder (DEC) 708, that uses fully-connected layers and convolutional layers to decode the latent variables 706 into an averaged semantic birds-eye view image 710. The VAE can be trained using averaged semantic birds-eye view images manually labeled by human operators as ground truth. For example, the VAE can be trained using averaged semantic birds-eye view images that labeled for a node and averaged semantic birds-eye view images that are labeled for adjacent nodes. The ground truth can be compared to the output from the VAE to train the VAE to correctly label averaged semantic birds-eye view images for a node.

Since the stereo images obtained by a vehicle 105 may vary from the stereo images obtained by a mapping vehicle 145 at a node 202 (e.g., due to deviations in the sensor calibrations between vehicles, deviations in vehicle positions on the roadway when the stereo images are obtained, etc.), the decoder 708 can be detached from the rest of the VAE and the averaged semantic birds-eye view image 710 can be input to the encoder 704. The encoder 704 can then encode the averaged semantic birds-eye view image 710 into latent variables 706, which are used to determine the closest node 202 to the vehicle 105 and the three DoF pose of the vehicle 105 relative to the closest node 202. Encoding the averaged semantic birds-eye view image into latent variables allows the first computer 110 to identify the topological node 202 closest to the vehicle 105 and the three DoF pose of the vehicle 105 relative to the closest topological node 202 regardless of any variations between the stereo images obtained by the vehicle 105 and stereo images obtained by the mapping vehicle 145 at the corresponding node 202. The closest topological node 202 is defined as the topological node with a three DoF location that has the least Euclidian distance in three dimensions from the three DoF location of the vehicle 105.

The first computer 110 can obtain a plurality of temporally successive images, e.g., stereo video data, and can input the plurality of temporally successive images into the topological CNN 700, which is trained to output an averaged semantic birds-eye view image 710 based on the plurality of temporally successive images. The first computer 110 can then input the averaged semantic birds-eye view image 710 into the CNN 700 after detaching the decoder 708, such that the encoder 704 outputs latent variables 706 for the averaged semantic birds-eye view image 710. Upon generating the latent variables 706, the first computer 110 can, for example, input the latent variables 706 to a nearest neighbor classifier that comprises programming to compare the latent variables 706 to latent variables of the averaged semantic birds-eye view image for each of the topological nodes 202. For example, the classifier can use a machine learning technique in which latent variables labeled as representing various topological nodes is provided to a machine learning program for training the classifier. Once trained, the classifier can accept as input latent variables and then provide as output an identification of a topological node nearest the vehicle 105. Additionally, the first computer 110 can input the latent variables 706 to fully connected layers that process the latent variables 706 to output the three DoF pose of the vehicle 105 relative to the closest node 202.

Upon determining the closest node 202 and the three DoF pose of the vehicle 105 relative to the closest node 202, the first computer 110 can determine a three DoF pose in real-world coordinates for the vehicle 105 using the equation:

$$P_o^v = P_o^n \cdot P_n^v \qquad (3)$$

where $P_o^v$ is the three DoF pose of the vehicle 105 in real-world coordinates measured with respect to the origin of the topological map 200, $P_o^n$ is the three DoF pose of the closest node 202 measured with respect to the topological map 200 origin, and $P_n^v$ is the three DoF pose of the vehicle 105 measured with respect to the closest topological node 202.

Upon determining the DoF pose in real-world coordinates for the vehicle 105, the first computer 110 can, for example, generate a path along which to operate the vehicle 105. The first computer 110 can then actuate one or more vehicle components 125 to operate the vehicle 105 along the path. As used herein, a "path" is a set of points, e.g., that can be specified as coordinates with respect to a vehicle coordinate system and/or geo-coordinates, that the first computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x) = a_0 + a_1 x + a_2 x^2 + a_3 x^3 \qquad (3)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

Techniques described herein improve vehicle localization by generating and processing a birds-eye view image to improve the estimate of the three DoF pose for the vehicle 105. The birds-eye view image improves the ability of the vehicle computer 110 to locate objects in the environment around the vehicle 105 regardless of the weather and/or lighting conditions, which allows for improved localization of the vehicle 105 despite changes in environmental conditions at a node 202 after node 202 data was acquired. Further, techniques described herein improves computation by processing the 2D birds-eye view image as compared to a 3D semantic point cloud image. Further, the CNN 700 requires one set of ground truth data for each node 202 to be trained to output an averaged birds-eye view image for a node 202 based on temporally successive stereo images. That is, the CNN 700 can output the averaged semantic birds-eye view image for a node 202 based on temporally successive stereo images obtained in environment, i.e., weather and/or lighting, conditions that are not included in the ground truth data. Said differently, the ground truth data does not need to include ground truth data for each node 202 in each environment condition, thereby reducing the amount of ground truth data required to train the CNN 700.

Figure 8:
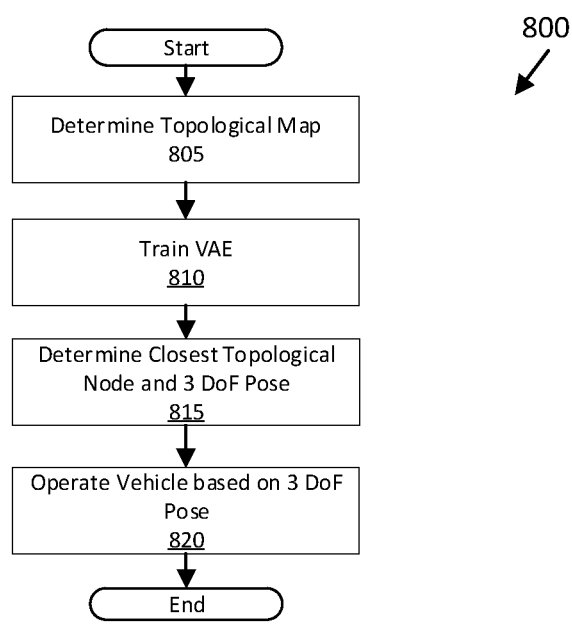
FIG. 8 is a flowchart diagram of an example process to operate a vehicle based on three degree-of-freedom localization.

FIG. 8 is a diagram of an example process 800 for determining a three DoF pose of a vehicle 105 based on a plurality of temporally successive stereo images, i.e., stereo video data. The process 800 begins in a block 805. The process 800 can be carried out by a first computer 110 included in the vehicle 105 executing program instructions stored in a memory thereof.

In the block 805, a topological map 200 is determined for a roadway 204, 206 by traversing the roadway with a mobile platform equipped with a stereo camera as discussed in relation to FIG. 2. For example, a mapping vehicle 145 can traverse the roadway 204, 206 and obtain stereo video data. Alternatively, any mobile platform, e.g., robots, drones, boats, etc., can be used to determine a route. The topological map 200 includes a plurality of nodes 202, where each node 202 includes a three DoF location and an averaged semantic birds-eye view image 504.

A second computer 150 can identify a node 202 in the topological map 200, or the second computer 150 can provide the stereo video data to a remote server computer 140 that can be programmed to identify the node 202. A plurality of temporally successive stereo images from the stereo video data are processed by a computer 140, 150 to produce a semantic point cloud image 402, where distance to points in the image are grouped and labeled as discussed in relation to FIG. 4. For example, a semantic point cloud image 402 can include labels for roadways, vehicles, pedestrians, buildings and foliage. The computer 140, 150 can determine a three DoF pose for the node 202 based on the semantic point cloud image 402, as discussed above. Additionally, the semantic point cloud image 402 is processed by the computer 140, 150 to produce a semantic birds-eye view image 502 for the node 202, as discussed above. The computer 140, 150 then generates an averaged semantic birds-eye view based on the semantic birds-eye view image 502 and a plurality of modified semantic birds-eye views, as discussed above. The process 800 continues in a block 810.

In the block 810, a first computer 110 in a vehicle 105 trains a topological CNN 700 to input a plurality of temporally successive stereo images and output an averaged semantic birds-eye view image 504 for a node 202 in the topological map 200, as discussed in relation to FIG. 7. The topological CNN 700 can also be trained to output a three DoF pose for the vehicle 105 that acquired the plurality of temporally successive stereo images and a closest topological node 202 to the vehicle 105. The process 800 continues in a block 815.

In the block 815, the first computer 110 uses the trained topological CNN 700 to determine a three DoF pose for the vehicle 105 relative to the closest node 202 and the closest topological node 202 in the topological map 200. For example, the first computer 110 can obtain a plurality of temporally successive stereo images, i.e., stereo video data, of an environment around the vehicle 105 while operating the vehicle 105 along a roadway 204, 206. The first computer 110 can then input the plurality of temporally successive stereo images to the topological CNN 700.

Upon receiving the averaged semantic birds-eye view image 504 for the node 202, the first computer 110 can input the averaged semantic birds-eye view image 504 into the topological CNN 700 with a decoder 708 detached such that an encoder 704 of the topological CNN 700 outputs latent variables 706 corresponding to the averaged semantic birds-eye view image 504. The first computer 110 can then process the latent variables 706 to determine a closest topological node 202 to the vehicle 105 and a three DoF pose of the vehicle 105 relative to the closest topological node 202, as discussed above. The first computer 110 can then determine a three DoF pose for the vehicle 105 relative to the topological map 200 by combining the three DoF pose for the vehicle 105 relative to the closest node 202 and the three DoF of the closest node 202 relative to the topological map 200, as discussed above. The process 800 continues in a block 820.

In the block 820, the first computer 110 can use the three DoF pose of the vehicle 105 with respect to the topological map 200 to operate the vehicle 105. That is, after localizing the vehicle 105, the first computer 110 can determine a path along which to operate the vehicle 105, as discussed above. The first computer 110 can then actuate one or more vehicle components 125, e.g., braking, steering, and/or propulsion, to move the vehicle 105 along the path. Following the block 820, the process 800 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
receive a plurality of temporally successive vehicle sensor images as input to a variational autoencoder neural network that outputs an averaged semantic birds-eye view image that includes respective pixels determined by averaging semantic class values of corresponding pixels in respective images in the plurality of temporally successive vehicle sensor images;
from a plurality of topological nodes that each specify respective real-world locations, determine a topological node closest to a vehicle, and a three degree-of-freedom pose for the vehicle relative to the topological node closest to the vehicle, based on the averaged semantic birds-eye view image; and
determine a real-world three degree-of-freedom pose for the vehicle by combining the three degree-of-freedom pose for the vehicle relative to the topological node and a real-world location of the topological node closest to the vehicle.

2. The system of claim 1, wherein the instructions further include instructions to generate the averaged semantic birds-eye view image based on rendering a semantic point cloud image of an environment around the vehicle into a two dimensional plane.

3. The system of claim 2, wherein the instructions further include instructions to generate the semantic point cloud image based on combining a semantic image that includes regions labeled by region type and a stereo point cloud image that includes regions labeled by region distance relative to the vehicle.

4. The system of claim 3, wherein the instructions further include instructions to generate the stereo point cloud image based on a pair of stereo images acquired by a sensor in the vehicle.

5. The system of claim 3, wherein the instructions further include instructions to generate the semantic image based on a single stereo image acquired by a sensor in the vehicle.

6. The system of claim 3, wherein the region types include roadway, sidewalk, vehicle, building, and foliage.

7. The system of claim 1, wherein the instructions further include instructions to determine the topological nodes by acquiring point cloud images with a stereo camera and determining locations of the point cloud images in real-world coordinates with visual odometry.

8. The system of claim 1, wherein the real-world three degree-of-freedom pose for the vehicle is determined in coordinates based on orthogonal x and y axes and a yaw rotation about a z axis orthogonal to the x and y axes.

9. The system of claim 1, wherein the instructions further include instructions to train the variational autoencoder neural network to output the averaged semantic birds-eye view image using a plurality of modified semantic birds-eye view images.

10. The system of claim 9, wherein the instructions further include instructions to generate each of the plurality of modified sematic birds-eye view images based on at least one of translating or rotating the semantic birds-eye view image.

11. The system of claim 1, wherein the variational autoencoder neural network determines the three degree-of-freedom pose for the vehicle relative to the topological node closest to the vehicle by outputting latent variables to fully connected layers.

12. The system of claim 1, wherein the variational autoencoder neural network determines the topological node closest to the vehicle by inputting latent variables of the averaged semantic birds-eye view to a nearest neighbor classifier trained to determine the topological node closest to the vehicle.

13. A method, comprising:
receiving a plurality of temporally successive vehicle sensor images as input to a variational autoencoder neural network that outputs an averaged semantic birds-eye view image that includes respective pixels determined by averaging semantic class values of corresponding pixels in respective images in the plurality of temporally successive vehicle sensor images;
from a plurality of topological nodes that each specify respective real-world locations, determining a topological node closest to a vehicle, and a three degree-of-freedom pose for the vehicle relative to the topological node closest to the vehicle, based on the averaged semantic birds-eye view image; and determining a real-world three degree-of-freedom pose for the vehicle by combining the three degree-of-freedom pose for the vehicle relative to the topological node and a real-world location of the topological node closest to the vehicle.

14. The method of claim 13, further comprising generating the averaged semantic birds-eye view image based on rendering a semantic point cloud image of an environment around the vehicle into a two dimensional plane.

15. The method of claim 14, further comprising generating the semantic point cloud image based on combining a semantic image that includes regions labeled by region type and a stereo point cloud image that includes regions labeled by region distance relative to the vehicle.

16. The method of claim 13, further comprising determining the topological nodes by acquiring point cloud images with a stereo camera and determining locations of the point cloud images in real-world coordinates with visual odometry.

17. The method of claim 13, wherein the real-world three degree-of-freedom pose for the vehicle is determined in coordinates based on orthogonal x and y axes and a yaw rotation about a z axis orthogonal to the x and y axes.

18. The method of claim 13, further comprising training the variational autoencoder neural network to output the averaged semantic birds-eye view image using a plurality of modified semantic birds-eye view images.

19. The method of claim 13, wherein the variational autoencoder neural network determines the three degree-of-freedom pose for the vehicle relative to the topological node closest to the vehicle by outputting latent variables to fully connected layers.

20. The method of claim 13, wherein the variational autoencoder neural network determines the topological node closest to the vehicle by inputting latent variables of the averaged semantic birds-eye view to a nearest neighbor classifier trained to determine the topological node closest to the vehicle.

* * * * *